(12) United States Patent
Preiss

(10) Patent No.: US 10,000,396 B1
(45) Date of Patent: Jun. 19, 2018

(54) DISSOLUTION CHAMBER SYSTEM

(71) Applicant: Adrian A. Preiss, Valrico, FL (US)

(72) Inventor: Adrian A. Preiss, Valrico, FL (US)

(*) Notice: Subject to any disclaimer, the term of this patent is extended or adjusted under 35 U.S.C. 154(b) by 223 days.

(21) Appl. No.: 15/067,888

(22) Filed: Mar. 11, 2016

(51) Int. Cl.
*C02F 1/78* (2006.01)
*C02F 1/467* (2006.01)
*C02F 9/00* (2006.01)

(52) U.S. Cl.
CPC .............. *C02F 1/78* (2013.01); *C02F 1/4674* (2013.01); *C02F 9/00* (2013.01); *C02F 2201/003* (2013.01); *C02F 2201/782* (2013.01)

(58) Field of Classification Search
CPC .......... C02F 1/46; C02F 1/467; C02F 1/4674; C02F 1/78; C02F 9/00; C02F 9/005; C02F 2201/003; C02F 2201/782; C01B 11/022; C01B 13/10; C01B 13/11; C01B 13/115

See application file for complete search history.

(56) References Cited

U.S. PATENT DOCUMENTS

| 5,865,995 A | * | 2/1999 | Nelson | ................... | B01D 19/00 |
| | | | | | 210/205 |
| 2011/0048964 A1 | * | 3/2011 | Luebke | ............... | C02F 1/46104 |
| | | | | | 205/687 |

* cited by examiner

*Primary Examiner* — Lucas Stelling

(57) ABSTRACT

An ozone dissolution chamber utilizes the principle of laminar stratification of gas in a turbulent dissolution chamber. The dissolution chamber is much shorter in height than the conventional tower dissolution chamber, and ensures a high degree of dissolution of ozone in water and, consequently, a high degree of oxidation of organic and metal impurities to a final oxidation state.

2 Claims, 3 Drawing Sheets

DISSOLUTION CHAMBER SYSTEM

RELATED APPLICATION

The present application is an improvement over my prior U.S. patent application Ser. No. 13/685,807 filed Oct. 27, 2012, now U.S. Pat. No. 8,980,085, issued May 17, 2015, the subject matter of which application is incorporated herein by reference.

BACKGROUND OF THE INVENTION

Field of the Invention

The present invention concerns an ozone dissolution chamber utilizing the principle of laminar stratification of gas in a turbulent dissolution chamber. The resulting dissolution chamber is much shorter in height than the conventional tower dissolution chamber, and ensures a high degree of dissolution of ozone in water and, consequently, a high degree of oxidation of organic and metal impurities to a final oxidation state.

Description of the Related Art

It is known to introduce ozone into water to eliminate contaminants, in particular bacterial contaminants. Ozone has been used as a chemical treatment to oxidize organic matter, metals, bacteria, and viruses in the water being treated. Dissolved ozone also forms an oxide coating on the surface of submerged metals, preventing corrosion. An ozone molecule is a rapid oxidizer that will oxidize organic matter quickly. Oxidized organics and metals can gain electrons and assume a positive attraction for other negatively charged particles, causing them to amalgamate, forming larger clumps easily removed by a filter.

The ozonation process can be broken down into two steps: (1) production of ozone in the form of a gas, and (2) contacting water with the ozone gas for a time sufficient to achieve some degree of oxidation of organics and metals present in the water. No matter how the ozone is produced, ozonation is not effective unless the gas water interface is broken and the ozone is sufficiently dissolved within the water being treated. Thus, many attempts have been made to optimize ozone-water contact.

In conventional ozone dissolution chambers, the ozone gas is applied at the base of a tall column. The ozone-oxygen bubbles float to the surface slowly, their upward movement slowed by the downward counter flow of the water stream. In order to achieve a sufficient contact time for the ozone to dissolve in the water before the water and ozone pass from the mixing column, the counter-current flow mechanism is combined with a contact column. The concentration of dissolved ozone-oxygen is undesirably diluted in the larger vertical columns. While ozone-oxygen contact in mixing chambers is generally effective, there is a need for improved mixing in more compact sized mixing vessels.

Attempts to improve the contact particularly in conjunction with swimming pools are described in U.S. Pat. No. 4,640,783 (Kern) and U.S. Pat. No. 4,966,717 (Kern). However, these systems require much space or must be deployed inside the swimming pool itself. Further improvements are required.

Ozone generators designed specifically for use in treatment of water are also well known. However, upon closer inspection, it can be seen that each of these designs is associated with inherent disadvantages.

For example, U.S. Pat. No. 5,451,318 (Morehead) teaches a filtration system for water or other selected liquids that includes an ozone mixing station, a primary solids and gas separator and, if desired, a second vortex particle separator and filter system. The ozone mixing station includes a high efficiency ozone generator and a channel arrangement, such as a spiral tubular treatment coil, through which the ozone/liquid mixture passes to assure thorough mixing and provide time for effective treatment. In practice, it has been found that the amount of energy required to force water through a spiral tubular treatment coil, particularly in counter-current flow arrangement, results in a significant pressure drop between the water inlet and water outlet side of the coil. Further, there is room for improvement in the water-ozone contact.

U.S. Pat. No. 5,709,799 (Engelhard) simply teaches bubbling ozone through a short tank containing water to be treated and venting ozone as it reaches the top of the tank. This design produces little effective ozone-water contact.

U.S. Pat. No. 4,141,830 (Last) teaches an ozone/ultraviolet water purifier wherein ozone is generated in a tubular chamber from which it enters the bottom of a water column and flows upwards along with upwards flowing water. This design, in addition to being tall, is inefficient in that it does not even take advantage of a counter-current flow mechanism to amplify the effective ozone-water contact time.

U.S. Pat. No. 5,266,215 (Engelhard) and U.S. Pat. No. 5,540,848 (Engelhard) teach a compact but inefficient water purification unit, wherein an ozone generator may be incorporated to entrain ozone along with inflowing water. Since the ozone flows along with water rather than counter-current, and since the contact column is short, the ozone-water contact is not optimal. U.S. Pat. No. 5,674,312 (Mazzei) teaches an apparatus and process for injecting high concentrations of a treatment gas into a liquid stream which is devoid of undissolved gas or a gas phase. The liquid stream is passed through a gas inducing injector to receive treatment gas, and then is passed through a centrifugal liquid/gas separator from which entrained gases and liquid with dissolved treatment gases are separately withdrawn. Although the conduit in which gas injection into the liquid stream occurs is indicated to have a length selected to provide enough residence time for the intended liquid/gas exchange to occur, contact time is relatively short, the gas travels along with the liquid and not in counter-current manner, and unused gas must be withdrawn, which evidences that the ozone-water contact is in need of improvement.

U.S. Pat. No. 4,123,800 (Mazzei) teaches an injector-mixer in which the dissolution chamber is extremely small, and in which the residency time is short.

There is thus a need for a device which optimizes ozone-water contact, which is compact and efficient, and which does not impede the flow of water.

SUMMARY OF THE INVENTION

It is an object of the invention to provide a dissolution chamber which is self-regulating, and in which ozone achieves optimal mixing and dissolution in water.

It is a further object of the invention to provide a mixing chamber that is simple in design, can be assembled from conventional parts, and is highly effective.

Broadly, these and other objects of the present invention have been accomplished by an ozone dissolution chamber utilizing the principle of laminar stratification of gas in a turbulent dissolution chamber. The resulting dissolution chamber is much shorter than the conventional tower dissolution chamber, and ensures a high degree of dissolution of ozone in water and, consequently, a high degree of oxidation of organic and metal impurities to a final oxidation state.

The present invention uses a dissolution chamber wherein ozone-containing water is injected generally horizontally and tangentially at or near the upper end of the chamber. Depending upon the amount of gas accumulated in the upper end of the chamber, the injected ozone-containing water may fall slightly through a reservoir of ozone which collects near the top of the chamber before tangentially hitting turbulent swirling water which fills most of the chamber. The tangential impact of the injected water, together with the large number of bubbles present in the water, results in a turbulent swirling motion of the water. An outlet pipe extends into the chamber and has an inlet opening near the bottom of the chamber. Due to the suspended spinning of the ozone bubbles with respect to the outer walls of the chamber, the ozone achieves excellent contact with the water.

Further, due to the location of the ozone-laden water inlet at the top of the chamber and the location of the dissolution chamber outlet at or near the bottom of the chamber (which is contrary to the conventional design), ozone bubbles tend to form a laminar stratification in the dissolution chamber. That is, the larger bubbles tend to gravitate towards the top of the tank, where they are acted upon and broken down by the impact of the injected ozone-laden water. The finer the bubbles, the lower the buoyancy of the bubbles, and the greater the likelihood that the bubbles will be entrained in the downward-and-outward flowing water and migrate toward the bottom of the tank and ultimately leave the tank in the form of super-fine bubbles or completely dissolved ozone. Thus, a laminar stratification is formed, with larger bubbles having greater buoyancy and collecting near the top of the dissolution chamber, with decreasing diameter bubbles with increasing depth in the dissolution chamber, and finally with super fine bubbles or dissolved ozone at or near the bottom of the tank.

Obviously, utilization of the ozone is optimized, since large bubbles tend to remain in the dissolution chamber until broken down, and only fine bubbles or completely dissolved ozone tends to leave the dissolution chamber. As a consequence, as the water to be treated enters the dissolution chamber and flows downwards through the laminar stratifications and into layers with ever-finer bubbles, and finally leaves the dissolution chamber, organics and metals tend to be exposed to super fine or dissolved ozone and to be completely oxidized. It is surprising that this superior effect is achieved in a system which is contrary to the conventional tall column dissolution chamber wherein ozone bubbles are introduced into the bottom of the tank and percolate upwards. It is also surprising that superior contact time can be achieved in a dissolution chamber which is not short and wide but is readily scalable.

The present invention thus provides advantages which would be expected to be associated with a scalable column dissolution chamber but without the space requirement, and provides the advantages which would be expected to be found in a long spiral tube dissolution chamber, but without the disadvantageous pressure drop between water inlet and exit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
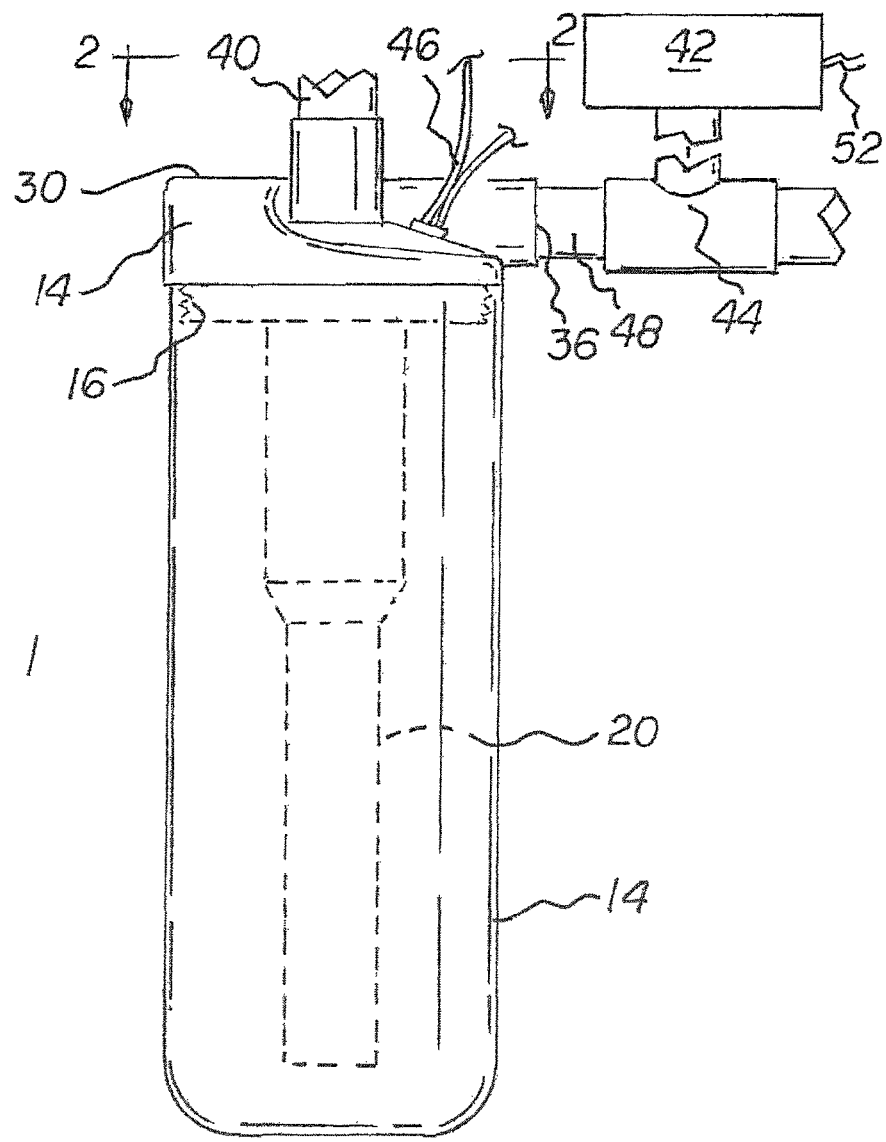
FIG. 1 is a front elevational view of a ozone dissolution chamber constructed in accordance with the principles of the present invention.
Figure 2:
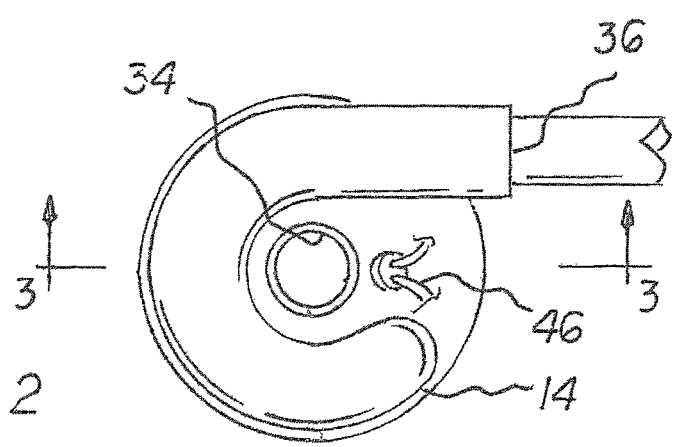
FIG. 2 is a cross sectional view taken along line 2-2 of FIG. 1.
Figure 3:
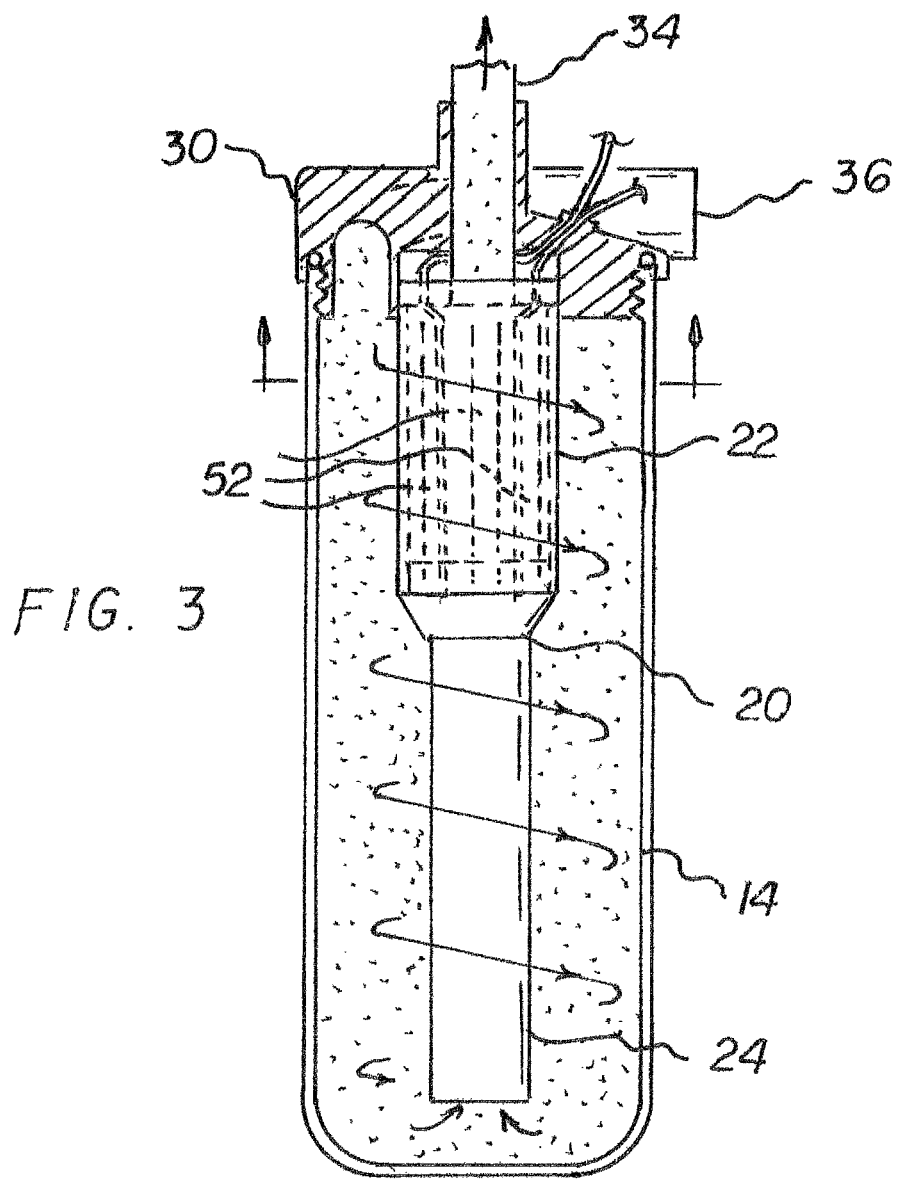
FIG. 3 is a cross sectional view taken along line 3-3 of FIG. 1.
Figure 4:
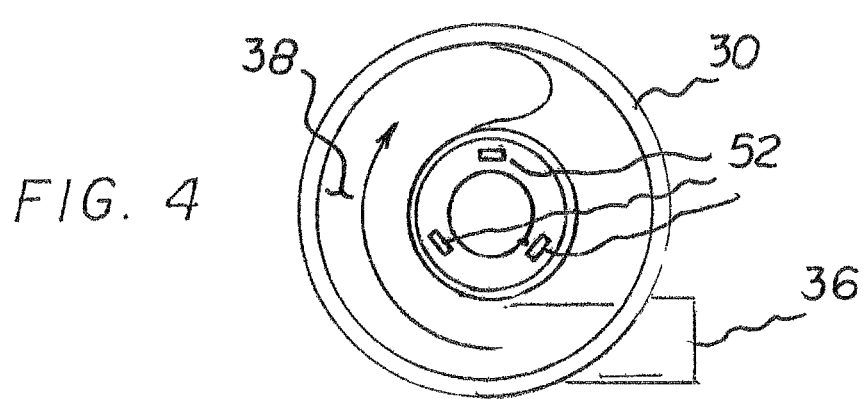
FIG. 4 is a cross sectional view taken along line 4-4 of FIG. 3.

Ozonation in accordance with the present invention can be used to purify water for numerous applications, such as: cooling towers, ship ballasts, swimming pool, water fountain, pond and aquatic mammal tanks, large aquariums of 20 gallon or greater capacity, industrial carpet cleaning, car/truck washing, industrial plant equipment wash water recycling, wastewater, spas, drinking, vegetable washing, lift stations, ice for fish industry, irrigation systems, reclaimed water, etc., with or without wireless monitoring service.

As discussed above, the ozonation process can be broken down into two steps: (1) production of ozone in the form of a gas, and (2) contacting water with the ozone gas for a time sufficient to achieve oxidation of organics and metals present in the water. The process of ozone production, though not considered a part of the present invention, will be discussed first.

Ozone Production

Ozone can be produced by passing oxygen through the space between two electrodes which conduct high voltage current in ozone generator. A dielectric insulating material causes a breakdown of the current in the space between an inner electrode and an outer electrode. This breakdown of the current between the electrodes produces a corona electron field of high energy. As oxygen passes through this corona field, oxygen molecules attract addition electrons, causing the oxygen molecules to disassociate and form separate oxygen atoms. Some of these free oxygen atoms will recombine to form ozone; three oxygen atoms with three electrons.

Conventional electrodes used in corona-discharge ozone generators use a solid conductive material to form and inner electrode spaced from an outer electrode. To avoid excessive resistance heating, the electrode sizes must be increased for high current applications. Improved performance can be obtained by using a perforated or grill-like outer electrode, with a fan or the like to blow cooling air over the electrodes. The inner electrode is preferably is a quartz-glass vacuum tube containing a gas vapor which acts as the conductor-electrode, with the quartz glass wall of the vacuum tube acting as the dielectric insulator. The conductive vapor molecules inside the vacuum tube form a "bridge" which conducts high voltage current over the entire interior surface of the inner electrode, providing a much large surface area than the surface area which is normally available on a continuous solid conductor tube or flat-plate surface used as an inner electrode in conventional corona-discharge generators.

A motorized veriac transformer may be used to adjust the current to the high-voltage transformer supplying the ozone generator so that the amount of ozone produced may be increased or decreased. The veriac transformer may be manually adjusted or automatically controlled by controller.

Ozone may also be generated through ultraviolet irradiation of air within a housing. It is well known that ultraviolet radiation in air will alter the molecular structure of oxygen (O.sub.2), to produce ozone (O.sub.3). Ultraviolet light located in an air environment or air space within a tube will convert some of the oxygen molecules in the air space between the light and the tube to ozone molecules.

Corona discharge type ozone generators are generally preferred in view of efficiency and reliability. U.S. Pat. No. 5,855,856 (Karison) teaches an ozone generating apparatus that includes an ozone generator having concentric electrodes and a means for generating a corona discharge between the electrodes, a pump for recirculating a portion of the ozone-containing gas leaving the generator through a conduit which is configured to receive a portion of the ozone containing gas, and a heat exchanger for cooling the recirculated portion of the ozone-containing gas. An oxygen-containing gas is also introduced to the heat exchanger and combined with the recirculated gas portion to form a feed gas which is chilled in the heat exchanger and then introduced into the generator. See also U.S. Pat. No. 5,766,560 (Cole).

The water containing ozone (and usually oxygen, which may be in the form of substantially pure oxygen, air or other suitable mixture of gases that includes oxygen) is then conveyed to the dissolution chamber according to the present invention.

Dissolution Chamber

An exemplary dissolution chamber will be described by reference to the embodiment shown in FIGS. 1-5. The present invention uses a dissolution chamber which is basically a large empty container of anywhere from about 1 to 100 gallon capacity, preferably 5 to 50 gallons, and more preferably 10-30 gallons. The minimum diameter of the chamber would be about 4 inches. The maximum height of the chamber would be about 10 inches.

As an example, considering the water flow rates encountered in treatment of a conventional domestic swimming pool, a 5-6 gallon chamber with a 4 inch diameter and 20-24 inch height would be sufficient. The chamber may be made of any material having resistance to ozone, and for reasons of low cost and ready availability, PVC is preferred. The chamber may be any shape, but a featureless barrel shape having a smooth circular inner wall is preferred in order not to interfere with a swirling motion introduced by the injected ozone laden water into the contained liquid.

Ozone-laden water obtained as discussed above is injected through inlet pipe preferably tangentially near the upper end of the chamber, and in the case that gaseous ozone collects at the top of the chamber, may fall slightly through the reservoir of ozone which collects near the top of the chamber before tangentially hitting the water which fills most of the chamber. The injected water imparts a turbulence and swirling motion to the reservoir water upon striking the surface of the water. Obviously, as larger bubbles tend to congregate near the top of the chamber, the injected water is effectively employed in impacting and breaking up the larger bubbles. Finer bubbles tend not to resist the downward flow of water, and thus tend to move outwards and downwards. The result is a laminar stratification of bubbles, with larger bubbles near the top of the chamber, ever finer bubbles going deeper into the chamber, and ultra fine bubbles or completely dissolved gas at the very bottom of the chamber.

A dissolution chamber outlet pipe extends into the chamber and has an inlet opening near the bottom of the chamber. Due to the pressure and rotating movement, and the large volume of the dissolution chamber, the ozone has a high residency time, does not leave the chamber until it is micronized or dissolved, and is well contacted with the water. As a result of the positioning of the ozone-laden water inlet at the top of the chamber and outlet at the bottom of the chamber, which is contrary to the conventional design, ozone bubbles tend not to leave the chamber until they are broken up and reduced to a fine size or dissolved, ensuring that the ozone is completely available to oxidize organic matter and metals in the water being treated.

In the case that a significant amount of ozone, oxygen and/or air accumulate at the top of the chamber, the greater will be the tendency for large bubbles to be entrained in the water and be forced out the dissolution chamber outlet pipe. Thus, an equilibrium will be established as to the amount of the ozone gas forming a layer at the top of the chamber, it becomes impossible for too much ozone to accumulate in the dissolution chamber, and no manual adjustment or control is required.

It is a feature of the present invention that organic matter, such as algae, hair, bacteria, etc., can be completely oxidized. This complete oxidation may occur in one pass, but in certain applications more than one pass of the water being treated through this type of dissolution chamber or multiple smaller chambers will be required. This differs from the prior art, where ozone contact was less effective and oxidization resulted in inactivation of bacteria and partial break-down of organic matter, but not complete oxidization of carbon-based material to the final state—carbon dioxide. In the present invention the ozone in the liquid stream can cause organic matter and metals to be completely oxidized.

Illustrative Embodiment

Figure 5:
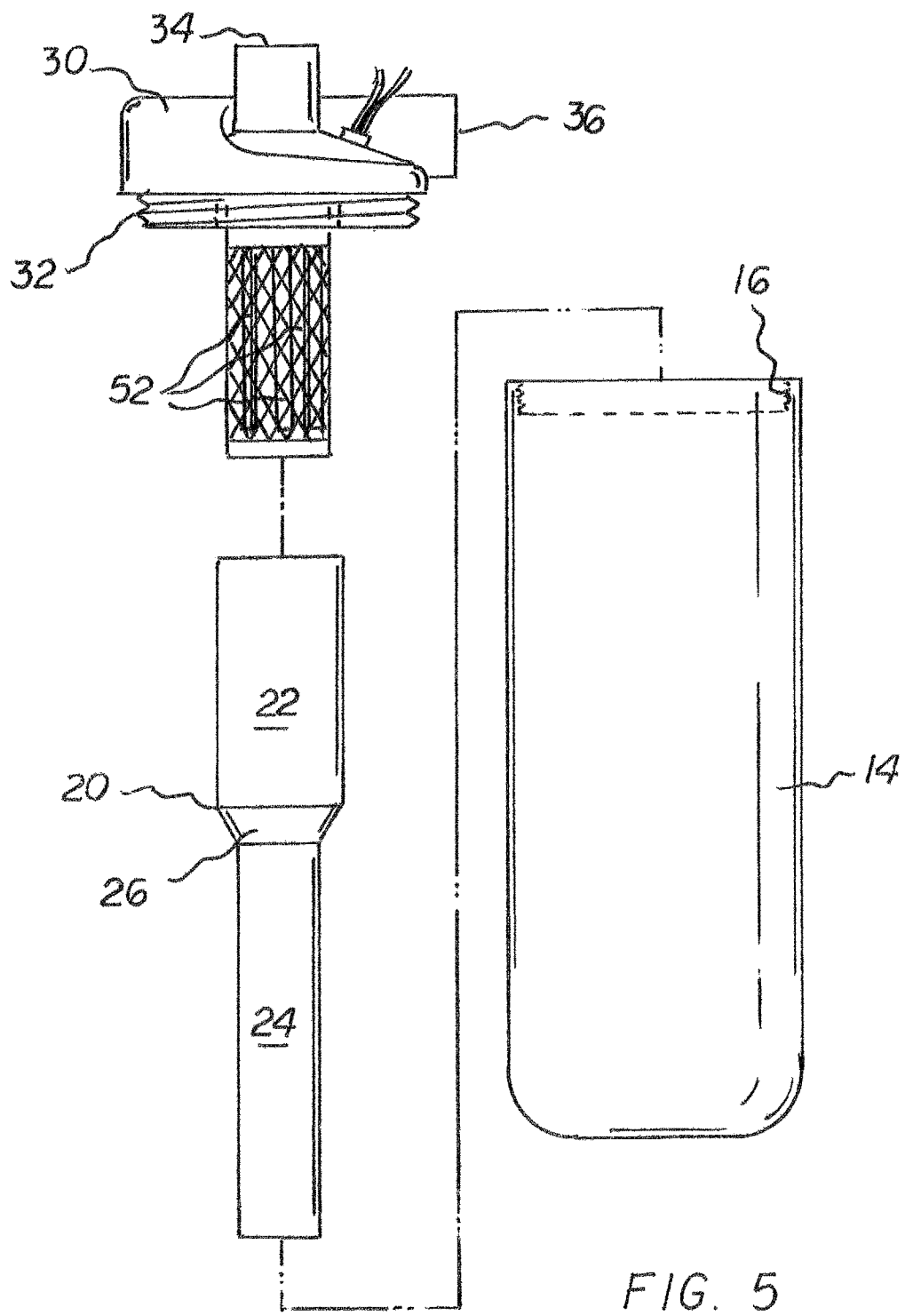
FIG. 5 is an exploded perspective view illustrating the various components of the ozone dissolution chamber shown in the prior Figures.

The invention will now be described using as an example the ozone contacting chamber shown in FIG. 5 which is designed for use in a system designed for treating a swimming pool, but could equally well be used in treating hot tub or fountain water with sizes of 950 liters (250 gallons) and up.

Pool water traveling through a pipe enters a venturi injector which draws ozone in from an ozone generator as discussed above. The ozone laden water proceeds through a pipe of no less than 0.50 inches, to enter the dissolution chamber 12 having a diameter of 4 inches and a height of 20-24 inches in the preferred embodiment. The dissolution chamber can be constructed by capping one end of a pipe having the desired diameter and length. Dissolution chambers for use in purification of hot tub water would have the same dimensions. The pipe entering the dissolution chamber after passing through the chamber top to provide a horizontal and tangential outlet into the dissolution chamber and thereby aid in imparting turbulence and a swirling motion to the water and ozone in the chamber. The chamber and pipes are made of conventional PVC materials or other ozone resistant products.

The ozone introduced upstream through the venturi is entrained by water flow and enters the dissolution chamber through pipe, which can be formed by a pipe with an outlet located from one quarter to one inch from the side wall of the chamber, wherein the inlet pipe is approximately parallel to the nearest side wall. Ozone gas bubbles of various sizes are formed in the chamber, with larger bubbles having greater lift and accumulating in the upper end of the dissolution chamber. At the same time the water, which is continuously agitated and churning, breaks up and pushes down gas bubbles within the water in the chamber. A laminar stratification of gas bubbles results, with larger bubbles collecting near the upper end of the chamber and smaller bubbles being entrained in the water flow and moving downwards towards the bottom of the dissolution chamber. Due to the turbulence to which bubbles are subjected to over and over again, bubble sizes are reduced to a minimum and the gas-water liquid interface is overcome, allowing for maximum dissolution of ozone into the water.

As the water is drawn from the bottom of the chamber through pipe a redox increase can be seen of 600 millivolts or more, preferably 650 millivolts or more, and as much as 850 millivolts, with this process. This extensive and unique contacting process has never been applied in process for purifying water for swimming pools, thus ozone has never been able to be dissolved adequately in water. A 3 to 5 lb pressure drop was achieved for this to work properly in the example. It was found that the dissolution chamber for ozone must be no less than 18 inches tall at a water flow of approximately 25-75 gallons per minute with an outer diameter of no less than 4 inches for this flow rate.

A increase of 4-12 inches in height should accompany flow rates of 10 gallons a minute increments above the 50 gallons, per minute in order to maintain proper dissolution of ozone in the water and also to obtain and hold a redox potential in excess of 600 millivolts, preferably 650-850 millivolts. The inlet of the exit pipe should be at least 0.50 but no more than 6 inches off the bottom of the floor dissolution chamber floor.

The result of the orchestration of the bubble traffic and the flow direction and residency time of the water, the contact time between the ozone and water is effectively increased, and the ozone is dissolved in the water to a great extent, resulting in a high degree or even complete oxidation of organic material in the water. In the preferred embodiment, at least 30 to 90% of the organic material is completely oxidized before leaving the enclosed space. This is a significant feature of the present invention. The method can be repeated two or more times in two or more sequential contacting chambers.

A dissolution chamber 10 as illustrated in FIGS. 1-8 comprises a plurality of components.

First provided is an exterior tube 14, vertically disposed and being in a cylindrical configuration. The exterior tube has an open top and a closed bottom. The exterior tube has female screw threads 16 adjacent to the top. The exterior tube has a central axis. The exterior tube has a first length and a first diameter.

Next provided is an interior tube 20, vertically disposed and having a cylindrical configuration. The interior tube has an open top and an open bottom. The interior tube has an axis co-extensive with the central axis. The interior tube has an upper extent 22 with a second length and a second diameter less than the first diameter. The interior tube has a lower extent 24 with a third length and a third diameter less than the second diameter. The interior tube has an intermediate extent 26 with a fourth length. The intermediate extent has a frusto-conical configuration coupling the upper and lower extents. The first length is greater than the second length plus the third length plus the fourth length.

A cap 30 is next provided. The cap has a lower region with male screw threads 32 removably received by the female screw threads of the exterior tube. A downwardly facing annular recess receives and frictionally supports the top of the upper extent of the interior tube. An exit orifice 34 extends vertically through the cap. The cap and the exit orifice have axes co-extensive with the central axis. An entrance orifice 36 extends horizontally into the cap. The entrance orifice has an axis tangential to the cap. A passageway 38 extends downwardly in an arcuate path of travel between 170 and 190 degrees from the entrance orifice to a location between the interior and exterior tubes adjacent to the male and female screw threads. The interior and exterior tubes provide a fluid flow path downwardly between the interior and exterior tubes then upwardly through the interior tube. A vertical tube 40 extends through the exit orifice from the upper extent of the interior tube to above the cap and beyond.

An ozone generator 42 and Venturi injector 44 are operatively coupled to the cap in advance of the entrance orifice for adding ozone to the water passing into and through the cap and then along the fluid flow path. Electrical wires 46 couple the electrodes to a source of potential. A horizontal input tube 48 couples the ozone generator and Venturi injector to the cap.

Lastly, an electrolytic cell composed of a plurality of electrical plates 52 are positioned within the upper region of the interior tube. In the disclosed preferred embodiment, at least three such electrodes are utilized. Such electrodes function to produce a chemical reaction in the form of chlorine dioxide to chlorite residual in the body of water thereby maximizing contact time and speed of chlorite production while concurrently abating the reformation of bubbles in the water passing through the electrolytic cell and electrodes.

The present invention combines the long approved water treatment process of ozonation with the well proven technology of in-stream electrolysis. The result of this combination produces a variety of powerful oxidants: Atomic Oxygen, Ozone, Hydroxyl radicals, Chlorine dioxide to chlorite.

The following chart summarizes the relative strength of these oxidants. Atomic Oxygen has an ORP value of 2.42 v. Due to the extremely short half lives, hydroxyl radicals and atomic oxygen (microseconds or less) are not considered significant water treatment options. Atomic oxygen (O.sub.1) is the precursor for oxone (O.sub.3). Hydroxyl radicals occur when ozone comes in contact with water increasing with pH.

| Oxidation-Reduction Potentials of Oxidizing Biocides | |
| --- | --- |
| Reaction | Oxidation Reduction Potential Volts (V) |
| Hydroxyl radicals + hydrogen ions produce water $HO- + H^+ + e^- \leftrightarrow H_2O$ | 2.76 |
| Ozone + hydrogen ions produce oxygen + water $O_3 + 2H^+ + 2e^- \leftrightarrow O_2 + H_2O$ | 2.076 |
| Hydroxyl radicals produce hydroxyl ions $HO- + e^- \leftrightarrow HO^-$ | 2.02 |
| Hydrogen peroxide + hydrogen ions produce water $H_2O_2 + 2H^+ + 2e^- \leftrightarrow 2H_2O$ | 1.776 |

-continued

| Oxidation-Reduction Potentials of Oxidizing Biocides | |
|---|---|
| Reaction | Oxidation Reduction Potential Volts (V) |
| Permanganate ions + hydrogen ions produce manganese dioxide + water<br>$MnO_4^- + 4H^+ + 3e^- \leftrightarrow MnO_2 + 2H_2O$ | 1.679 |
| Hypochlorous acid + hydrogen ions produce chloride ion + water<br>$HOCl + H^+ + 2e^- \leftrightarrow Cl^- + H_2O$ | 1.482 |
| Hypobromous acid + hydrogen ions produce bromide ions + water<br>$HOBr + H^+ + 2e^- \leftrightarrow Br^- + H_2O$ | 1.331 |
| Oxygen + hydrogen ions produce water<br>$O_2 + 4H^+ + 4e^- \leftrightarrow 2H_2O$ | 1.229 |
| Hypoiodous acid + hydrogen ions produce iodide ions + water<br>$HOI + H^+ + 2e^- \leftrightarrow I^- + H_2O$ | 0.987 |
| Chlorine dioxide produces chlorate ions<br>$ClO_{2(aq)} + e^- \leftrightarrow ClO_2^-$ | 0.954 |
| Hypochlorite ions + water produce chloride ions + hydroxyl ions<br>$OCl^- + H_2O + 2e^- \leftrightarrow Cl^- + 2OH^-$ | 0.810 |
| Hypobromite + water produce bromide ions + hydroxyl ions<br>$OBr^- + H_2O + 2e^- \leftrightarrow Br^- + 2OH^-$ | 0.761 |
| Hypoiodite ions + water produce iodide ions + hydroxyl ions<br>$OI^- + H_2O + 2e^- \leftrightarrow I^- + 2OH^-$ | 0.485 |

The chart above, in a simpler form, is as follows:

Cl—+H$_2$O=HOCl+H++2e–(anode reaction in electrolysis cell)

Cl—+O$_3$+H+=HOCl+O$_2$ (it is hard to explain the results without this)

HOCl+O$_3$=ClO$_2$—+H++O$_2$

O$_3$+2ClO$_2$—+2H+=2ClO$_2$+O$_2$+H$_2$O (the chlorine dioxide would react with organics (bather demand)—but is also continuously regenerated in the electrolysis cell).

Although this invention has been described in its preferred form with a certain degree of particularity with respect to a dissolution chamber for ozone in a cooling tower, ship ballast, swimming pool water purification system, it is understood that the present disclosure of the preferred form has been made only by way of example, and that numerous changes in the details of structures and processes may be resorted to without departing from the spirit and scope of the invention. Further examples of water treatment processes include industrial carpet cleaning water purification, car wash water purification, industrial plant equipment wash water recycling and purification, wastewater purification, etc.

What is claimed is:

1. A dissolution chamber comprising:
an exterior tube with an open top and a closed bottom;
an interior tube with an open top and an open bottom, the interior tube having an upper extent and a lower extent, the upper extent having a greater diameter than the diameter of the lower extent, the interior tube also having an intermediate extent in a frusto-conical configuration coupling the upper and lower extents;
a cap having a lower region coupled to the exterior tube, the cap receiving the top of the interior tube, an exit orifice extending through the cap, an entrance orifice extending into the cap, a passageway extending from the entrance orifice to a location between the interior and exterior tubes, a spiral fluid flow path downwardly between the interior and exterior tubes then upwardly through the interior tube;
an ozone generator coupled to the cap in advance of the entrance orifice for adding ozone; and
an electrolytic cell with electrical plates positioned within the upper region of the interior tube to produce a chemical reaction in the form of chlorine dioxide to chlorite residual.

2. A dissolution chamber (10) comprising, in combination:
an exterior tube (14) vertically disposed and being in a cylindrical configuration with an open top and a closed bottom, the exterior tube having female screw threads (16) adjacent to the top, the exterior tube having a central axis, the exterior tube having a first length and a first diameter;
an interior tube (20) vertically disposed and having a cylindrical configuration with an open top and an open bottom, the interior tube having an axis co-extensive with the central axis, the interior tube having an upper extent (22) with a second length and a second diameter less than the first diameter, the interior tube having a lower extent (24) with a third length and a third diameter less than the second diameter, the interior tube having an intermediate extent (26) with a fourth length, the intermediate extent having a frusto-conical configuration coupling the upper and lower extents, the first length being greater than the second length plus the third length plus the fourth length;
a cap (30) having a lower region with male screw threads (32) removably received by the female screw threads of the exterior tube, a downwardly facing annular recess receiving and frictionally supporting the top of the upper extent of the interior tube, an exit orifice (34) extending vertically through the cap, the cap and the exit orifice having axes co-extensive with the central axis, an entrance orifice (36) extending horizontally into the cap, the entrance orifice having an axis tangential to the cap, a passageway (38) extending downwardly in an arcuate path of travel between 170 and 190 degrees from the entrance orifice to a location between the interior and exterior tubes adjacent to the male and female screw threads, the interior and exterior tubes providing a fluid flow path downwardly between the interior and exterior tubes then upwardly through the interior tube, a vertical tube (40) extending through the exit orifice from the upper extent of the interior tube to above the cap and beyond;
an electrolytic cell composed of at least three electrical plates (52) positioned within the upper region of the interior tube to produce a chemical reaction in the form of chlorine dioxide to chlorite residual in the body of water thereby maximizing contact time and speed of chlorite production while concurrently abating the reformation of bubbles in the water passing through the electrolytic cell and the electrical plates; and
an ozone generator (42) and Venturi injector (44) operatively coupled to the cap in advance of the entrance orifice for adding ozone to the water passing into and through the cap, and then along the fluid flow path, electrical wires (46) coupling the electrical plates to a source of potential, a horizontal input tube (48) coupling the ozone generator and Venturi injector to the cap.

* * * * *